United States Patent [19]

Shea et al.

[11] Patent Number: 5,031,769
[45] Date of Patent: Jul. 16, 1991

[54] VEHICLE ORGANIZER

[76] Inventors: Francis L. Shea, 24 Prescott St., N. Andover, Mass. 01845; George Spector, 233 Broadway, New York, N.Y. 10007

[21] Appl. No.: 586,291
[22] Filed: Sep. 21, 1990
[51] Int. Cl.$^5$ .............................................. B65D 85/54
[52] U.S. Cl. .................................. 206/335; 206/373; 220/8
[58] Field of Search ....................... 206/373, 372, 335; 220/8

[56] References Cited
U.S. PATENT DOCUMENTS

| | | | |
|---|---|---|---|
| 4,210,244 | 7/1980 | Westrick | 206/373 |
| 4,682,691 | 7/1987 | Spigring | 206/373 |
| 4,844,279 | 7/1989 | Chalot | 206/373 |

Primary Examiner—Joseph Man-Fu Moy

[57] ABSTRACT

An article organizer for a motor vehicle is provided and consists of a rectangular housing having an open top with a plurality of partitions crating multiple compartments to hold different articles in an orderly manner. Hand grips are on the housing so that it can be carried therefrom and a plurality of anti-skid fingers are on the bottom of the housing to a prevent it from sliding about. In a modification the housing and partitions are adjustable to compensate for different sized articles that fit into the compartments.

4 Claims, 1 Drawing Sheet

VEHICLE ORGANIZER

BACKGROUND OF THE INVENTION

The instant invention relates generally to storage boxes and more specifically it relates to an article organizer for a motor vehicle which provides multiple compartments to hold different articles therein that is carried in the motor vehicle.

There are available various conventional storage boxes which do not provide the novel improvement of the invention herein disclosed.

SUMMARY OF THE INVENTION

A primary object of the present invention is to provide an article organizer for a motor vehicle that will overcome the shortcomings of the prior art devices.

Another object is to provide an article organizer for a motor vehicle that can be placed within the trunk of an automobile so that the multiple compartments of the organizer can hold different articles therein in an orderly manner.

An additional object is to provide an article organizer for a motor vehicle that includes an adjustable housing to compensate for articles of different sizes to be held therein.

A further object is to provide an article organizer for a motor vehicle that is simple and easy to use.

A still further object is to provide an article organizer for a motor vehicle that is economical in cost to manufacture.

Further objects of the invention will appear as the description proceeds.

To the accomplishment of the above and related objects, this invention may be embobied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
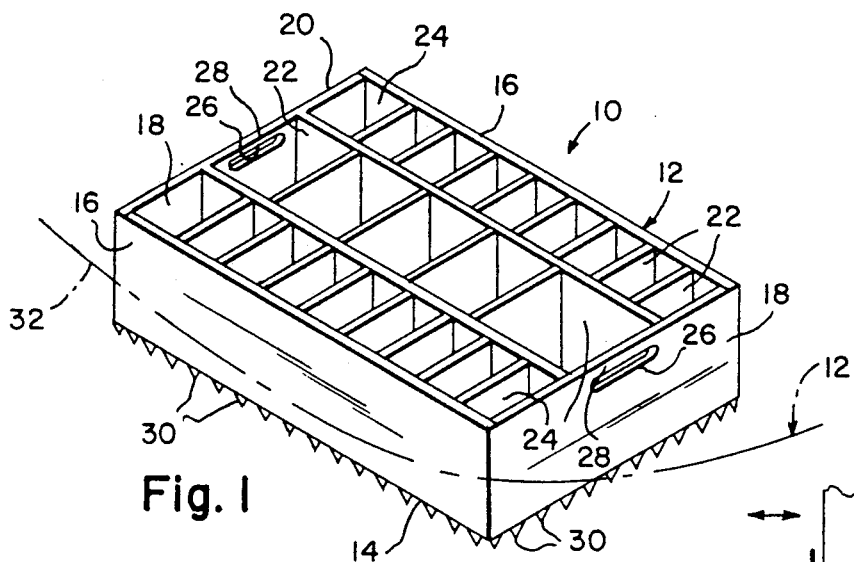
FIG. 1 is a perspective view of the invention.

Turning now descriptively to the drawings, in which similar reference characters denote similar elements throughout the several views, FIG. 1 illustrates an article organizer 10 for a motor vehicle 12 consisting of a rectangular housing 12 having a bottom wall 14, two long side walls 16, two short walls 18 and an open top 20. A plurality of partitions 22 are within the housing 12 creating multiple compartments 24 therein to hold different articles in an orderly manner. Each short end wall 18 of the housing 12 has an elongated aperture 26 near the open top 20 forming a hand grip 28 so that the organizer 10 can be carried therefrom. A plurality of anti-skid fingers 30 are molded into the bottom wall 14 of the housing 12 to prevent the organizer 10 from sliding about when the organizer is placed into the motor vehicle 12, such as the truck 32 or the like.

Figure 2:
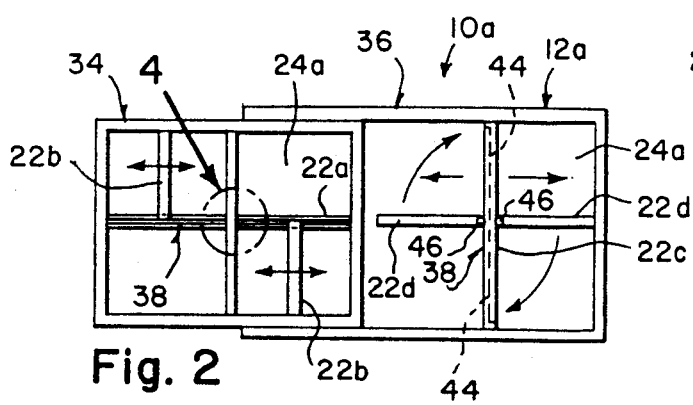
FIG. 2 is a top view of a modification having an adjustable housing.
Figure 3:
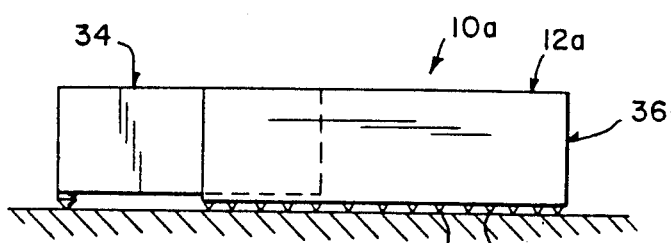
FIG. 3 is a side view of FIG. 2.

FIGS. 2 and 3 show a modified article organizer 10a, wherein the housing 12a is divided into two segments 34 and 36 in which the first segment 34 is slideably adjustable within the second segment 36 thereby changing the overall length of the housing 12a.

The article organizer 10a further includes a mechanism 38 for adjustably positioning the partitions 22a to 22d within the housing 12a thereby changing the sizes of the compartments 24a to compensate for articles of different sizes to fit into the compartments.

Figure 4:
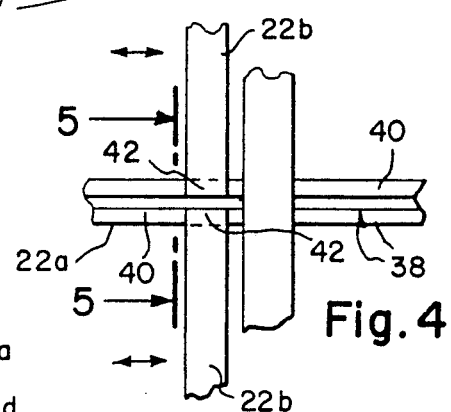
FIG. 4 is an enlarged detail view as indicated by arrow 4 in FIG. 2, showing the groove track in greater detail.
Figure 5:
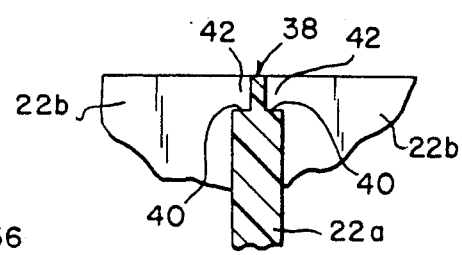
FIG. 5 is a cross sectional view taken along line 5—5 in FIG. 4, showing the tongue of the partitions in engagement with the groove track.

The adjustably positioning mechanism 38 includes a partitions 22a which is stationary within first segment 34 of the housing 12a. The partition 22a has groove tracks 40 formed on the top edge thereof. Other partitions 22b are movable within the first segment 34 of the housing 12. The partitions 22b have tongues 42 at the top edges thereof which ride on the groove tracks 40 at right angles from the partition 22a. (See FIGS. 4 and 5).

Another partitions 22c which is also stationary within the second segment 36 of the housing 12a recess 44 in each opposite side. Two partitions 22d pivotable at 46 to the partition 22c so as to swing and fit into the recess 44 when not in use.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An article organize for a motor vehicle comprising:
   (a) a rectangular housing having a bottom wall, two long side walls, two short end walls and an open top;
   (b) a plurality of partitions within said housing creating multiple compartments therein to hold different articles in an orderly manner;
   (c) each short end wall of said housing having an elongated aperture near the open top forming a hand grip so that said organizer can be carried therefrom; and
   (d) a plurality of anti-skid fingers molded into the bottom wall of said housing to prevent said organizer from sliding bout when said organizer is placed into the motor vehicle.

2. An article organizer as recited in claim 1, wherein said housing is divided into two segments in which said first segment is slideably adjustable within said second segment, thereby changing the overall length of said housing.

3. An article organizer as recited in claim 2, further including means for adjustably positioning said partitions within said housing thereby changing the sizes of the compartments to compensate for articles of different sizes to fit into the compartments.

4. An article organizer as recited in claim 3, wherein said adjustably positioning means includes:
   (a) said first partition which is stationary within said first segment of said first partition having a groove track formed in the top edge thereof;
   (b) said second partition which is movable within said first segment of said housing, said second partition having a tongue at the top edge thereof which rides on said groove tack at a right angle from said first partition;

(c) said third partition which is stationary within said second segment of said housing, said third partition having a recess therein; and (d) said fourth partition which is pivotable to said third partition, so as to swing and fit into said recess when not in use.

* * * * *